United States Patent
Baram

(10) Patent No.: US 8,150,770 B1
(45) Date of Patent: Apr. 3, 2012

(54) SYSTEM AND METHOD FOR REORDERING CHECKS

(75) Inventor: Andrew Baram, Pittsburgh, PA (US)

(73) Assignee: The PNC Financial Services Group, Inc., Pittsburgh, PA (US)

(*) Notice: Subject to any disclaimer, the term of this patent is extended or adjusted under 35 U.S.C. 154(b) by 289 days.

(21) Appl. No.: 12/209,860

(22) Filed: Sep. 12, 2008

Related U.S. Application Data

(63) Continuation of application No. 10/747,583, filed on Dec. 29, 2003, now abandoned.

(51) Int. Cl.
 G06Q 40/00 (2006.01)

(52) U.S. Cl. .......................... 705/45; 705/35

(58) Field of Classification Search .......... 705/35, 705/39, 45; 235/379
See application file for complete search history.

(56) References Cited

U.S. PATENT DOCUMENTS

| | | | | |
|---|---|---|---|---|
| 3,333,869 | A * | 8/1967 | Alexander | 462/57 |
| 4,014,566 | A * | 3/1977 | Cantrell et al. | 462/75 |
| 4,845,486 | A | 7/1989 | Knight et al. | |
| 5,305,199 | A | 4/1994 | LoBiondo et al. | |
| 5,842,976 | A | 12/1998 | Williamson | |
| 5,882,041 | A * | 3/1999 | Schara | 283/66.1 |
| 5,903,881 | A * | 5/1999 | Schrader et al. | 705/42 |
| 6,012,045 | A | 1/2000 | Barzilai et al. | |
| 6,076,074 | A | 6/2000 | Cotton et al. | |
| 6,351,735 | B1 | 2/2002 | Deaton et al. | |
| 6,418,416 | B1 | 7/2002 | Rosenberg et al. | |
| 6,575,362 | B1 | 6/2003 | Bator et al. | |
| 6,608,491 | B2 | 8/2003 | Salmon, Jr. | |
| 6,760,414 | B1 | 7/2004 | Schurko et al. | |
| 7,019,859 | B2 | 3/2006 | Phillips et al. | |
| 7,283,981 | B2 * | 10/2007 | Solem | 705/42 |
| 7,654,447 | B1 * | 2/2010 | Barth | 235/379 |
| 7,788,175 | B1 * | 8/2010 | Hadfield | 705/42 |
| 2003/0046229 | A1 * | 3/2003 | Cresswell | 705/42 |
| 2003/0135431 | A1 | 7/2003 | Schwartz et al. | |
| 2004/0138975 | A1 * | 7/2004 | Engel et al. | 705/35 |
| 2004/0236647 | A1 * | 11/2004 | Acharya | 705/30 |
| 2005/0131820 | A1 * | 6/2005 | Rodriguez et al. | 705/42 |
| 2005/0182725 | A1 | 8/2005 | Modica | |

OTHER PUBLICATIONS

Intuit Checks, Forms & Supplies—Help QuickBooks; http://intuitmarket.intuit.com/fsg/help/help_page.asp?file=usage/QuickBooks.htm; 2002; pp. 1-3.*
O'Brien, Jeanne; "Hibernia fortifies Web banking with target marketing function"; Bank Systems & Technology, v37, n3; Mar. 2000; pp. 1 and 2.*
Business Wire; "Wells Fargo Idaho: Wells Fargo schedules Northwest account conversions"; Nov. 7, 1996; pp. 1 and 2.*
Item Processing Report, V 13, n24; "ACOM Financial Documents Division Announces On-Line Check Ordering for Bank Customers"; Dec. 5, 2002; p. 1.*
U.S. Appl. No. 12/315,247, filed Dec. 1, 2008.
"Check Reorder Express : Login," printed from https://checkreorderexpress.com/prodreorder/reorder_form.cfm, Internet site, accessed on Oct. 28, 2003, 1 page.

(Continued)

Primary Examiner — Ella Colbert
(74) Attorney, Agent, or Firm — Robert J. Pugh; K&L Gates LLP

(57) ABSTRACT

A method for reordering checks for a customer is disclosed. The method includes ordering a first quantity of checks for the customer, tracking usage of the first quantity of checks, and ordering a second quantity of checks for the customer when a predetermined quantity of the first quantity of checks has been processed.

21 Claims, 2 Drawing Sheets

OTHER PUBLICATIONS

"History of just-in-time inventory—Google Search," www.google.com, search terms "history+of+just-in-time+inventory," search run on May 11, 2011.

"Intuit Quicken Setup Guide, Getting Maximum Benefit With Minimum Effort," 2001.

"Just-in-time (business)," *Wikipedia, the free encyclopedia*, printed from http://en.wikipedia.org/wiki/Just in time inventory, Internet site, accessed on Jan. 31, 2011, 9 pages.

Jocelyn P. Taylor, "Check Fraud: Preventive Measures for Business," *Journal of Cash Management*, v12n1, Jan./Feb. 1992, pp. 34-38, 17 pages.

Office Action dated Feb. 2, 2011 for U.S. Appl. No. 12/315,247, filed Dec. 1, 2008.

Office Action dated Jul. 27, 2011 for U.S. Appl. No. 12/315.247, filed Dec. 1, 2008.

Notice of Allowance dated Dec. 9, 2011 for U.S. Appl. No. 12/315,247, filed Dec. 1, 2008.

* cited by examiner

SYSTEM AND METHOD FOR REORDERING CHECKS

This application is a continuation of co-pending U.S. application Ser. No. 10/747,583, filed on Dec. 29, 2003, which is incorporated herein by reference in its entirety.

BACKGROUND

This application is related, generally and in various embodiments, to systems and methods for reordering checks for customers.

When a customer of, for example, a financial institution begins to run out of checks, the customer traditionally has had several ways to order another supply of checks. For example, many customers travel to a branch office of the financial institution and place the order with a branch office employee, or call a customer contact center of the financial institution and place the order with a customer contact center employee. However, reordering checks in either of the above-described ways is not an efficient use of the customers' or the employees' time, and relies on the customer to initiate the check reorder.

Another way to reorder checks is for the customer to access a check reorder website to place an order for an additional supply of checks. The customer can place the order by providing and submitting certain information such as the account number, routing number, etc. Although reordering checks in this manner eliminates the direct involvement of the employees of the financial institution, the process still relies on the customer to initiate the check reorder.

SUMMARY

In one general respect, this application discloses embodiments of a method for reordering checks for a customer. According to various embodiments, the method includes ordering a first quantity of checks for the customer, tracking usage of the first quantity of checks, and ordering a second quantity of checks for the customer when a predetermined quantity of the first quantity of checks has been processed.

In another general respect, this application discloses embodiments of a system for reordering checks for a customer. According to various embodiments, the system includes a computing device for tracking usage of a first quantity of checks and ordering a second quantity of checks when a predetermined quantity of the first quantity of checks has been processed.

DETAILED DESCRIPTION

As used herein, the term "check" means any negotiable instrument drawn against deposited funds, to pay a specified amount to a specific entity upon demand.

Figure 1:
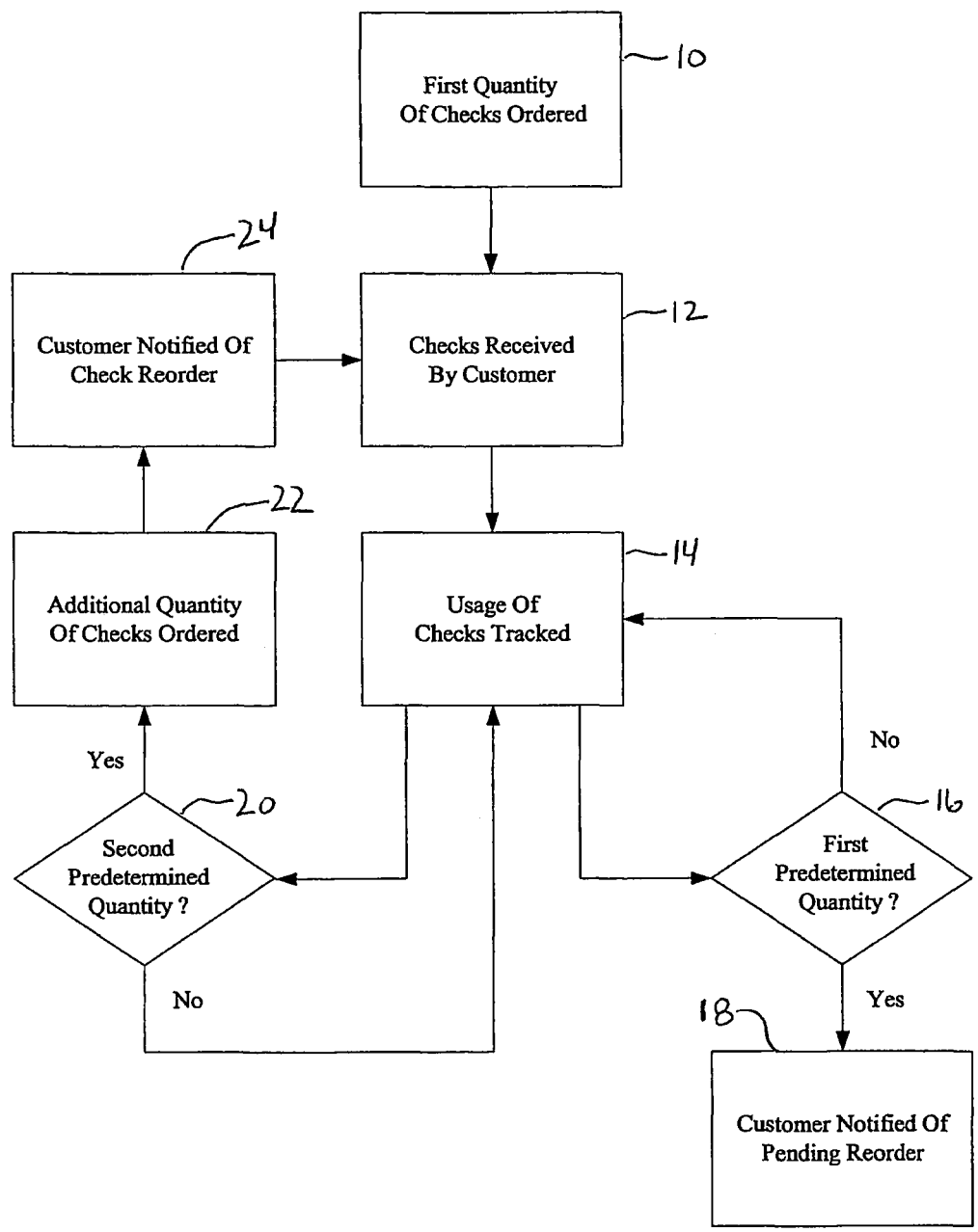
FIG. 1 illustrates a process flow of a method for reordering checks according to various embodiments.

FIG. 1 illustrates a process flow of a method for reordering checks according to various embodiments of the disclosed invention. The process begins at block 10, where a first quantity of checks is ordered for a customer. The first quantity of checks ordered for the customer may be an initial order or a reorder of checks for the customer. The customer may be a customer of, for example, a financial institution, and the first quantity of checks may be any quantity such as, for example, one-hundred, two-hundred, or four-hundred checks. The customer may request the financial institution to order the first quantity of checks or the financial institution may order the first quantity of checks when a checking account is opened for the customer.

When the first quantity of checks is ordered, information such as the name of the financial institution, the routing number, the account number, the starting and ending check numbers, the order quantity, and customer contact information may be provided to the entity receiving the order. Such customer contact information may include the customer's mailing address, telephone number, facsimile number, e-mail address, etc. The first quantity of checks may be printed by the financial institution or by a third-party check printer. After the first quantity of checks is printed, the checks may be delivered directly to the customer.

From block 10, the process advances to block 12, where the customer receives the first quantity of checks and may begin to use the first quantity of checks to draw against funds deposited with the financial institution. From block 12, the process advances to block 14, where the financial institution tracks the customer's usage of the first quantity of checks. To facilitate the tracking of the first quantity of checks, the financial institution may identify the customer account number and the check number for each check that has been processed. The checks may be processed by the financial institution or by a third-party processor. By tracking the usage of the first quantity of checks, the financial institution can determine a quantity of the first quantity of checks that has been processed. The quantity can be expressed in the form of a number or percentage of the first quantity of checks that has been processed.

As the usage of the first quantity of checks is being tracked at block 14, a determination is made at block 16 as to whether or not the quantity of the first quantity of checks that has been processed has reached a first predetermined quantity. The first predetermined quantity can be individualized for each customer, and can represent a particular number or percentage of the first quantity of checks that has been processed. For example, the first predetermined quantity for a particular customer may represent 70% of the first quantity of checks. By tracking the usage of the first quantity of checks at block 14, the financial institution can determine a difference between the first predetermined quantity and the quantity of the first quantity of checks that has been processed.

When the quantity of the first quantity of checks that has been processed reaches the first predetermined quantity, the process advances from block 16 to block 18, where the customer is notified that a check reorder will soon be placed for the customer. The customer may be notified of the pending reorder via a notification communicated to the customer via regular mail, electronic mail, telephone, facsimile, etc.

After a determination has been made at block 16 that the quantity of the first quantity of checks that has been processed has reached the first predetermined quantity and while the usage of the first quantity of checks is being tracked at block 14, a determination is also made at block 20 as to whether or not the quantity of the first quantity of checks that has been processed has reached a second predetermined quantity.

The second predetermined quantity is greater than the first predetermined quantity. Thus, the first predetermined quantity can be represented as a portion of the second predetermined quantity. The second predetermined quantity can be individualized for each customer, and can represent a particular number or percentage of the first quantity of checks that has been processed. For example, the second predetermined quantity for a particular customer may represent 80% of the first quantity of checks. By tracking the usage of the first quantity of checks at block 14, the financial institution can determine a difference between the second predetermined quantity and the quantity of the first quantity of checks that has been processed. Based on the usage rate of each particular customer, the first and second predetermined quantities can be raised or lowered at any time.

When the quantity of the first quantity of checks that has been processed reaches the second predetermined quantity, the process advances from block 20 to block 22, where a second quantity of checks is ordered for the customer. The second quantity of checks may be more than, less than or the same as the first quantity of checks. The order may be placed with the same entity that the order for the first quantity of checks was received by at block 10. However, before placing the order, the mailing address of record for the customer may be checked to verify that the address is a valid address.

When the order is placed for the second quantity of checks, information such as the name of the financial institution, the routing number, the account number, the starting and ending check numbers, the order quantity, and customer contact information may be provided to the entity receiving the order. Such customer contact information may include the customer's mailing address, telephone number, facsimile number, e-mail address, etc. The second quantity of checks may be printed by the financial institution or by a third-party check printer. After the second quantity of checks is printed, the additional checks may be delivered directly to the customer.

From block 22, the process advances to block 24, where the customer is notified that additional checks were ordered for the customer. The customer may be notified of the order via a notification communicated to the customer via regular mail, electronic mail, telephone, facsimile, etc.

From block 24, the process returns to block 12, where the customer receives the second quantity of checks and may begin to use the second quantity of checks to draw against funds deposited with the financial institution. From block 12, the process advances to block 14, where the financial institution tracks the customer's usage of the second quantity of checks. To facilitate the tracking of the second quantity of checks, the financial institution may identify the customer account number and the check number for each check that has been processed. The checks may be processed by the financial institution or by a third-party processor. By tracking the usage of the second quantity of checks, the financial institution can determine a quantity of the second quantity of checks that has been processed. The quantity can be expressed in the form of a number or percentage of the second quantity of checks that has been processed.

As the usage of the second quantity of checks is being tracked at block 14, a determination is made at block 16 as to whether or not the quantity of the second quantity of checks that has been processed has reached a first predetermined quantity. The first predetermined quantity can be individualized for each customer, and can represent a particular number or percentage of the second quantity of checks that has been processed. For example, the first predetermined quantity for a particular customer may represent 70% of the second quantity of checks. By tracking the usage of the second quantity of checks at block 14, the financial institution can determine a difference between the first predetermined quantity and the quantity of the second quantity of checks that has been processed.

When the quantity of the second quantity of checks that has been processed reaches the first predetermined quantity, the process advances from block 16 to block 18, where the customer is notified that another check reorder will soon be placed for the customer. The customer may be notified of the pending reorder via a notification communicated to the customer via regular mail, electronic mail, telephone, facsimile, etc.

After a determination has been made at block 16 that the quantity of the second quantity of checks that has been processed has reached the first predetermined quantity and while the usage of the second quantity of checks is being tracked at block 14, a determination is also made at block 20 as to whether or not the quantity of the second quantity of checks that has been processed has reached a second predetermined quantity.

The second predetermined quantity is greater than the first predetermined quantity. Thus, the first predetermined quantity can be represented as a portion of the second predetermined quantity. The second predetermined quantity can be individualized for each customer, and can represent a particular number or percentage of the second quantity of checks that has been processed. For example, the second predetermined quantity for a particular customer may represent 80% of the second quantity of checks. By tracking the usage of the second quantity of checks at block 14, the financial institution can determine a difference between the second predetermined quantity and the quantity of the second quantity of checks that has been processed. Based on the usage rate of each particular customer, the first and second predetermined quantities can be raised or lowered at any time.

When the quantity of the second quantity of checks that has been processed reaches the second predetermined quantity, the process advances from block 20 to block 22, where a third quantity of checks is ordered for the customer. The third quantity of checks may be more than, less than or the same as the first and/or second quantity of checks. The order may be placed with the same entity that the order for the first and/or second quantity of checks was received by at block 10. However, before placing the order, the mailing address of record for the customer may be checked to verify that the address is a valid address.

When the order is placed for the third quantity of checks, information such as the name of the financial institution, the routing number, the account number, the starting and ending check numbers, the order quantity, and customer contact information may be provided to the entity receiving the order. Such customer contact information may include the customer's mailing address, telephone number, facsimile number, e-mail address, etc. The third quantity of checks may be printed by the financial institution or by a third-party check printer. After the third quantity of checks is printed, the additional checks may be delivered directly to the customer.

From block 22, the process advances to block 24, where the customer is notified that additional checks were ordered for the customer. The customer may be notified of the order via a notification communicated to the customer via regular mail, electronic mail, telephone, facsimile, etc.

From block 24, the process again returns to block 12, where the customer receives the third quantity of checks and may begin to use the third quantity of checks to draw against funds deposited with the financial institution. The process flow sequence described in blocks 12-24 may be repeated any number of times. In addition, the above-described check reorder method may be performed concurrently for any number of customers.

Figure 2:
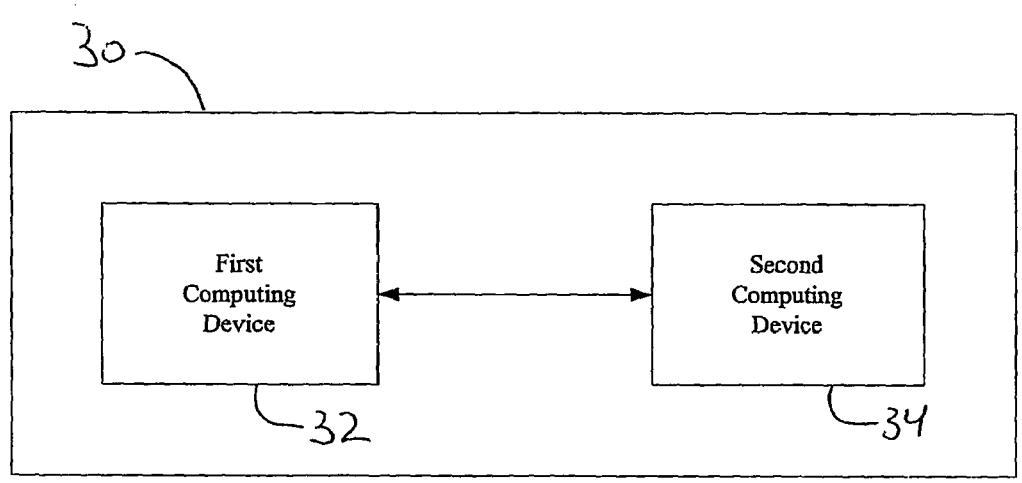
FIG. 2 illustrates a system for reordering checks according to various embodiments.

FIG. 2 illustrates a system 30 for reordering checks according to various embodiments. The system 30 may include a first computing device 32 and a second computing device 34 in communication with the first computing device 32 via, for example, one or more delivery systems for directly or indirectly connecting the first computing device 32 and the second computing device 34. Examples of such delivery systems include, but are not limited to, a local area network (LAN), a metropolitan area network (MAN), a wide area network (WAN), the Internet, an Intranet, an Extranet, the Web, a telephony network (e.g., analog, digital, wired, wireless, PSTN, ISDN, or xDSL), a radio network, a television network, a cable network, a satellite network, and/or any other wired or wireless communications network configured to carry data. Each network may include one or more elements, such as, for example, intermediate nodes, proxy servers, firewalls, routers, switches, adapters, sockets, and wired or wireless data pathways, configured to direct and/or deliver data. The first computing device 32 may be associated with the financial institution and the second computing device 34 may be associated with the financial institution or an entity such as a third-party check printer.

The first computing device 32 may be for tracking usage of a first quantity of checks and ordering a second quantity of checks when a predetermined quantity of the first quantity of checks has been processed. The computing device 32 may further be for generating a first customer notification when a predetermined portion of the first quantity of checks has been processed and for generating a second customer notification when the predetermined quantity of the first quantity of checks has been processed. The computing device 32 may further be for tracking usage of the second quantity of checks and ordering a third quantity of checks when a predetermined quantity of the second quantity of checks has been processed.

The computing device 32 may perform the above-described actions automatically and may perform the actions for any number of customers of the financial institution. Although the computing device 32 is shown as a single unit in FIG. 2 for purposes of convenience, it should be recognized that the computing device 32 may comprise a number of distributed computing devices, inside and/or outside the administrative domain.

In order to perform the actions described hereinabove, the computing device 32 may execute a series of instructions. The instructions may be software code to be executed by the computing device 32. The software code may be stored as a series of instructions or commands on a computer readable medium such as a random access memory (RAM) and/or a read only memory (ROM), a magnetic medium such as a hard-drive or a floppy disk, or an optical medium such as a CD-ROM. The software code may be written in any suitable programming language using any suitable programming technique. For example, the software code may be written in C using procedural programming techniques, or in Java or C++ using object-oriented programming techniques.

While several embodiments of the disclosed invention have been described, it should be apparent, however, that various modifications, alterations and adaptations to those embodiments may occur to persons skilled in the art with the attainment of some or all of the advantages of the disclosed invention. For example, the usage of a particular quantity of checks may be tracked at block 14 of FIG. 1 even after the quantity of the particular quantity of checks that has been processed exceeds the second predetermined quantity, and the actions described at blocks 22 and 24 may occur concurrently. It is therefore intended to cover all such modifications, alterations and adaptations without departing from the scope and spirit of the disclosed invention as defined by the appended claims.

What is claimed is:

1. A computer-implemented method for reordering checks for a plurality of customers of a financial institution, the method comprising:
generating, by a computer system, an order for a first quantity of checks for a first customer, wherein the order comprises an account number of the first customer and contact information for the first customer, and wherein the computer system comprises at least one processor and operatively associated memory;
tracking check usage, by the computer system, wherein the tracking usage comprises:
monitoring a portion of the first quantity of checks that has been processed for payment;
receiving from the first customer an indication of a threshold quantity specific to the first customer; and
determining when the portion of the first quantity that has been processed for payment exceeds the threshold quantity of the first quantity of checks;
upon determining that the portion of the first quantity that has been processed for payment exceeds the threshold quantity of the first quantity of checks, generating, by the computer system, an order for a second quantity of checks for the first customer; and
generating, by the computer system, a second order for a second order quantity of checks for a second customer, wherein the second order comprises an account number of the second customer and contact information for the second customer, and wherein tracking check usage further comprises:
monitoring a portion of the second order quantity of checks that has been processed for payment;
receiving from the second customer an indication of a second customer threshold quantity specific to the second customer; and
determining when the portion of the second order quantity of checks that has been processed for payment exceeds the second customer threshold quantity.

2. The method of claim 1, wherein tracking usage of the first quantity of checks comprises identifying each of the first quantity of checks that has been processed.

3. The method of claim 2, wherein identifying each check comprises identifying a customer account number and a check number.

4. The method of claim 1, wherein tracking usage comprises determining a quantity of the first quantity of checks that has been processed.

5. The method of claim 4, wherein tracking usage comprises determining a percentage of the first quantity of checks that has been processed.

6. The method of claim 4, wherein tracking usage comprises determining a difference between the threshold quantity and the quantity of the first quantity of checks that has been processed.

7. The method of claim 1, further comprising notifying the first customer before the second quantity of checks is ordered.

8. The method of claim 7, wherein notifying the first customer includes notifying the first customer by a notification communicated to the first customer via one of regular mail, electronic mail, telephone and facsimile.

9. The method of claim 1, further comprising notifying the first customer after the second quantity of checks is ordered.

10. The method of claim 9, wherein notifying the first customer comprises:
determining when the threshold quantity of the first quantity of checks has been processed; and
notifying the first customer when the threshold quantity of the first quantity of checks has been processed.

11. The method of claim 10, wherein notifying the first customer comprises notifying the first customer by a notification communicated to the first customer via one of regular mail, electronic mail, telephone and facsimile.

12. The method of claim 1, further comprising:
tracking usage of the second quantity of checks; and
ordering a third quantity of checks for the first customer when a threshold quantity of the second quantity of checks has been processed.

13. The method of claim 1, wherein the computer system comprises a plurality of computing devices.

14. A system for reordering checks for a plurality of customers, the system comprising:
a computing device comprising at least one processor and operatively associated data storage comprising software code that, when executed by the at least one processor, causes the computing device to:
generate an order for a first quantity of checks for the first customer, wherein the order comprises an account number of the first customer and contact information for the first customer;
track check usage, wherein tracking the usage comprises:
monitoring a portion of the first quantity of checks that has been processed for payment;
receiving for the first customer an indication of a threshold quantity specific to the first customer; and
determining when the portion of the first quantity that has been processed for payment exceeds the threshold quantity of the first quantity of checks;
upon determining that the portion of the first quantity that has been processed for payment exceeds the threshold quantity of the first quantity of checks, generate an order for a second quantity of checks for the first customer; and
generate a second order for a second order quantity of checks for a second customer, wherein the second order comprises an account number of the second customer and contact information for the second customer, and wherein tracking check usage further comprises:
monitoring a portion of the second order quantity of checks that has been processed for payment;
receiving from the second customer an indication of a second customer threshold quantity specific to the second customer; and
determining when the portion of the second order quantity of checks that has been processed for payment exceeds the second customer threshold quantity.

15. The system of claim 14, wherein the data storage further comprises software code that, when executed by the at least one processor, causes the computing device to: generate a first notification when a predetermined portion of the first quantity of checks has been processed.

16. The system of claim 15, wherein the data storage further comprises software code that, when executed by the at least one processor, causes the computing device to: generate a second notification when the threshold quantity of the first quantity of checks has been processed.

17. The system of claim 14, wherein the data storage further comprises software code that, when executed by the at least one processor, causes the computing device to: track usage of the second quantity of checks and order a third quantity of checks when a threshold quantity of the second quantity of checks has been processed.

18. A computer readable storage medium, having stored thereon instructions which when executed by a computing device, cause the computing device to:
generate an order for a first quantity of checks for the first customer, wherein the order comprises an account number of the first customer and contact information for the first customer;
track check usage, wherein tracking the usage comprises:
monitoring a portion of the first quantity of checks that has been processed for payment;
receiving for the first customer an indication of a threshold quantity specific to the first customer; and
determining when the portion of the first quantity that has been processed for payment exceeds the threshold quantity of the first quantity of checks;
upon determining that the portion of the first quantity that has been processed for payment exceeds the threshold quantity of the first quantity of checks, generate an order for a second quantity of checks for the first customer; and
generate a second order for a second order quantity of checks for a second customer, wherein the second order comprises an account number of the second customer and contact information for the second customer, and wherein tracking check usage further comprises:
monitoring a portion of the second order quantity of checks that has been processed for payment;
receiving from the second customer an indication of a second customer threshold quantity specific to the second customer; and
determining when the portion of the second order quantity of checks that has been processed for payment exceeds the second customer threshold quantity.

19. The computer readable storage medium of claim 18, having further stored thereon instructions which, when executed by the computing device, cause the computing device to generate a first notification when a predetermined portion of the first quantity of checks has been processed.

20. The computer readable storage medium of claim 19, having further stored thereon instructions which, when executed by the computing device, cause the computing device to generate a second notification when the threshold quantity of the first quantity of checks has been processed.

21. The computer readable storage medium of claim 18, having further stored thereon instructions which, when executed by the computing device, cause the computing device to track usage of the second quantity of checks and order a third quantity of checks when a threshold quantity of the second quantity of checks has been processed.

* * * * *